(12) United States Patent
Dultz et al.

(10) Patent No.: US 6,884,990 B2
(45) Date of Patent: Apr. 26, 2005

(54) METHOD FOR CHANGING THE POLARIZATION OF AT LEAST ONE OF THE PHOTONS EMITTED FROM A PHOTON-PAIR SOURCE INTO VARIOUS PARTIAL PATHS OF RAYS, AND METHOD FOR OPTIONALLY GENERATING INDIVIDUAL PHOTONS OR PHOTON PAIRS IN AN OPTICAL CHANNEL

(75) Inventors: Wolfgang Dultz, Frankfurt/M. (DE); Heidrun Schmitzer, Cincinnati, OH (US); Kay Michael Schmid, Frankfurt am Main (DE); Helmar A. Becker, Hanau (DE)

(73) Assignee: Deutsche Telekom AG, Bonn (DE)

( * ) Notice: Subject to any disclaimer, the term of this patent is extended or adjusted under 35 U.S.C. 154(b) by 145 days.

(21) Appl. No.: 10/221,931

(22) PCT Filed: Feb. 21, 2001

(86) PCT No.: PCT/EP01/01950

§ 371 (c)(1), (2), (4) Date: Dec. 3, 2002

(87) PCT Pub. No.: WO01/69840

PCT Pub. Date: Sep. 20, 2001

(65) Prior Publication Data

US 2004/0021063 A1 Feb. 5, 2004

(51) Int. Cl.$^7$ ............................................. G02F 1/01
(52) U.S. Cl. ........................ 250/225; 356/491; 398/184
(58) Field of Search ........................... 250/225, 227.17, 250/227.19, 227.27; 356/453, 491, 364, 368; 398/183, 184, 188, 189, 191; 380/255, 256

(56) References Cited

U.S. PATENT DOCUMENTS

| 4,451,151 A | | 5/1984 | Huignard |
| 5,339,182 A | * | 8/1994 | Kimble et al. ............... 398/158 |
| 6,748,081 B1 | * | 6/2004 | Dultz et al. .................. 380/277 |

FOREIGN PATENT DOCUMENTS

| DE | 198 23 849 | 12/1999 |
| WO | WO 99/66641 | 12/1999 |

OTHER PUBLICATIONS

"Basic of Quantum Computation" Vlatko Vedral, Martin B. Plenio; Blacket Laboratory, Imperial College, Prine Consort Road, London SW7 2BZ, U.K., pp. 1–39. 1998.

"Nichtlineare Optik II", Spezielle Prozesse, by Harry Paul, pp. 94–113, 1973.

* cited by examiner

*Primary Examiner*—Kevin Pyo
(74) *Attorney, Agent, or Firm*—Kenyon & Kenyon

(57) ABSTRACT

A method is provided for changing the polarization of at least one of the photons emitted from a photon pair source into various partial ray paths using an electro-optical modulator (EOM), which is positioned in the particular partial ray path being traversed by the photon to be influenced and which, in the activated state, is able to alter the polarization of a photon, the modulator being activated as a function of time such that the probability that the photon is found in the region of the electro-optical modulator in the activated state is at a maximum.

9 Claims, 4 Drawing Sheets

METHOD FOR CHANGING THE POLARIZATION OF AT LEAST ONE OF THE PHOTONS EMITTED FROM A PHOTON-PAIR SOURCE INTO VARIOUS PARTIAL PATHS OF RAYS, AND METHOD FOR OPTIONALLY GENERATING INDIVIDUAL PHOTONS OR PHOTON PAIRS IN AN OPTICAL CHANNEL

FIELD OF THE INVENTION

The present invention relates to a method for changing the polarization of at least one of the photons emitted from a photon-pair source into various partial paths of rays. The present invention also relates to a method for optionally generating individual photons or photon pairs in an optical channel.

BACKGROUND INFORMATION

The so-called quantum computer is of considerable interest for the development of calculating machines. In quantum computers, logic operations are performed on the basis of quantum states and by selectively Influencing such states. Quantum states may be described as resulting from the superposition of a large number of normalized, orthogonal base states, whose weighting is accomplished by probability masses which are definable by measuring processes. In quantum computers, the fundamental unit that corresponds to the binary bit, i.e., the fundamental unit for all arithmetic operations in traditional electronic computers, is the "quantum bit" (qubit). The quantum bit can be represented, in this context, as a linear, weighted, superposed state of two basic functions, namely of the basic functions "0" and "1". The basic functions correspond to the classic values 0 and/or 1 of the bit. The complex coefficients correspond to the weights with which the basic functions participate in the superposed state. The reference V. Vedral et al., Basics of Quantum Computation, Progr. In Quantum Electronics 22, 1 (1998), purportedly describes the fundamentals of the quantum computer.

An example of such a quantum state, which can be described as a superposition of two orthogonal basic functions, is the polarization state of light. Quantum bits can, therefore, be implemented as the polarization states of individual photons and as logic operations resulting from manipulation of the photons or photon pairs. As mathematical-topological equivalents, quantum bits are represented on the Bloch sphere and polarization states on the Poincare sphere as surface points.

By using light as the basis for a quantum computer, one derives the benefit of being able to selectively influence the polarization state of a single photon, emitted from a photon-pair source.

Another property of light, in this connection, may be that polarization states are correlated within one photon pair stemming from a single decay. The photon pair is quantum mechanically in a so-called "transposed state", which can be used as the starting state for the quantum computer.

A photon pair source is produced, for example, by an optically non-linear crystal in conjunction with an intensive optical pump light source, usually a laser light source. Under suitable geometric conditions, a single photon of the pump light source decays with a certain probability, while retaining energy and pulse, into two energy quanta or photons. The reference H. Paul, Nonlinear Optics, vol. 2, page 94 ff, Berlin 1973, purportedly describes this phenomenon as parametric fluorescence. The fluorescent light is emitted with two main frequencies or wavelengths, which differ depending on the excitation geometry, in defined spatial directions, relatively to the direction of propagation of the pumping beam. The two fluorescing photons are emitted virtually simultaneously, i.e., within a time period of about 10 femto-seconds, and, depending on the type of nonlinear crystal and the excitation geometry, in the same or in different spatial directions. The polarization of the fluorescing photons is thereby established. The physical properties of the two photons of the parametric fluorescence are linked to one another by a number of secondary conditions. In the case of the transposed photons, it may be a question, quantum mechanically, of a single state in which two photons reside inseparably, measurements at one of the photons allowing precise information to be obtained regarding the physical properties of the corresponding other photon.

The reference German Patent Application No. DE 198 23 849.5 purportedly describes a method and a device for optionally generating individual photons or photon pairs in an optical channel, by way of which a photon pair, in a quantum mechanically transposed state, is able to be selectively spatially separated, or propagated colinearly, as a pair. In purported accordance with the reference German Patent Application No. DE 198 23 849.5, from a photon pair source, photon pairs are generated in a quantum mechanically transposed state, and one photon of the pair is coupled into one partial path of rays of the device, respectively, the two partial paths of rays being reunited at a beam splitter and being directed into two common output channels. Positioned in the first partial path of rays is an interferometer, whose interferometer arms have optical path lengths $\delta l_F$ and $\delta l_S$. Positioned in the second partial path of rays is an optical delay path of optical length $\delta l$. Using means for varying optical path lengths $\delta l_F$, $\delta l_S$ and/or $\delta l$, these path lengths are adjustable such that photon pairs are generated which, as the result of interference, propagate co-linearly or separately in the output channels of the beam splitter. The adjustment is made, for example, via the measurement of the coincidences or spatial coincidences between the output channels.

The separation of the pairs in the context of the system discussed in the reference German Patent Application No. DE 198 23 849.5 is believed to be based on the quantum state of the one photon being split into two preferably separate probability distributions in the state space which have different, namely orthogonal polarization, and are spatially separate from one another. This probability distribution is achieved in that the photon propagates through a polarizing interferometer, which, for example, is a double-refractive crystal or an interferometer, whose design includes polarizing beam splitters aligned at less than 45° to the polarization of the photon. Due to the different optical path lengths in the interferometer arms, a photon is generated. The probability that it resides in the local space has two maxima, which propagate at the speed of light along the same light path and include states having orthogonal polarization. Such a photon, propagating in the z-direction, is shown, for example, schematically in FIG. 1. At Z1, the wave packet is horizontally linearly (y-direction) and, at Z2, vertically linearly polarized.

In this quantum state, the probabilities of finding the photon at Z1 and Z2 are differently polarized may be a drawback. Since it is always only indistinguishable photons which interfere with one another, the two residence probability regions around Z1 and Z2 should have the same polarization, to be optimally further processed and to be brought into interference with the photon in the second partial path of rays. The polarizations of the two regions Z1, Z2 can be compensated or made more alike in that the photon in the first partial path of rays propagates through a linear polarizer, which is situated at less than 45° with respect to the x- and y-axis. Here, half of the correlated photon pairs may be lost in this manner.

SUMMARY OF THE INVENTION

Exemplary embodiments and/or exemplary methods of the present invention may be directed to allowing selective changing of the polarization of one photon of a photon pair, and further, the polarization distribution of such a photon.

Exemplary embodiments and/or exemplary methods of the present invention may be directed to improving the efficiency of the method purportedly described in the reference German Patent Application No. DE 198 23 849 for optionally generating single photons or photon pairs in an optical channel.

Exemplary embodiments and/or exemplary methods of the present invention may be directed to changing the polarization of at least one of the photons emitted from a photon pair source into various partial ray paths using an electro-optical modulator (EOM), which is positioned in the particular partial ray path being traversed by the photon to be influenced and which, in the activated state, is able to alter the polarization of a photon, where the modulator (EOM) is activated as a function of time such that the probability that the photon is found in the region of the electro-optical modulator (EOM) in the activated state is at a maximum, and the modulator (EOM) must be deactivated following passage through the maximum. Further or in addition to, the photon-pair source may be an optically non-linear crystal that is pumped using a pulsed laser, and the instant when the modulator (EOM) is activated (activation instant), may be determined from the pulse-repetition rate and from the optical path length from the crystal to the electro-optical modulator (EOM), and/or the activation instant for influencing the one photon may be determined from the registration instant of the other photon, the other photon being registered without being destroyed.

Exemplary embodiments and/or exemplary methods of the present invention may be further directed to optionally generating individual photons or photon pairs in an optical channel using a photon-pair source, the photons of one photon pair being coupled into one partial path of rays of the device, and the two partial ray paths being united at a beam splitter and directed into two shared output channels of an interferometer positioned in the first partial ray path, as well as means for changing the optical path lengths of the interferometer arms and/or of the second partial path of rays, in the first partial ray path downstream from the interferometer, an electro-optical modulator (EOM) being positioned, which, in the activated state, is able to alter the polarization of a photon, where the modulator (EOM) is activated as a function of time such that the probability that the photon is found in the region of the electro-optical modulator (EOM) in the activated state is at a maximum, and the modulator (EOM) must be deactivated following passage through the maximum. Further or in addition to, the photon-pair source may be an optically non-linear crystal that is pumped using a pulsed laser, and the instant when the modulator is activated (activation instant), being determined from the pulse-repetition rate and from the optical path length from the crystal to the electro-optical modulator, and/or the activation instant for influencing the one photon may be determined from the registration instant of the other photon, the other photon being registered without being destroyed, and/or the activation instant of the modulator (EOM) is determined from the optical path length of one or both interferometer arms.

In this context, the interferometer may be a polarizing interferometer, which is positioned at less that 45° with respect to the polarization direction of the photon radiated into the first partial ray path.

Thus, in accordance with the present invention, the modulator may be activated as a function of time such that it is able to influence precisely that part of the photon's wave function whose polarization is to be changed. In the case of a photon having a nearly Gaussian-shaped probability distribution in the local space and constant polarization, the modulator may be activated already before the photon's arrival at the modulator, i.e., before the maximum of the residence probability or probability of finding the photon at the modulator is reached. The modulator is deactivated after the local residence probability has returned to zero, i.e., the photon has left the modulator. If the next photon is to be influenced, the modulator may also remain in an activated state. In the case of a photon having a split probability distribution, such as in FIG. 1, the modulator is activated such that it only influences the region around one of the maxima of the probability distribution.

If the first maximum, e.g., in FIG. 1 that around Z1, is to be manipulated, the modulator is, therefore, activated in a timely fashion before arrival of this partial wave packet, and is again deactivated, before arrival of the further partial wave packet, e.g., in FIG. 1 with the maximum around Z2. In this case, the duration of activation or the instant of deactivation is to be adapted to the time interval of the two partial wave packets and to be precisely observed, in order not to change the polarization of the second partial wave packet. Depending on the optical properties of the electro-optical modulator, in particular the activation and decay time, it may be practical to influence the second part of the wave packet. In this case, the activation instant must be precisely observed, the deactivation instant being less critical. For that reason, a modulator having a greater decay time may also be selected, it being necessary, however, for the modulator to be fully deactivated again and to be able activated upon arrival of the next photon.

When a photon-pair source working in pulsed operation is used, which is preferably an optically non-linear crystal that is pumped using a pulsed laser, the instant when the modulator is activated (activation instant), is preferably determined from the pulse-repetition rate and from the optical path length from the crystal to the electro-optical modulator. By performing a comparison measurement, one is able to determine the instants when the photon pairs are generated from the repetition rate and the distance of the detector from the photon-pair source. From the optical path length from the photon pair source to the modulator, it is possible to determine at which instant within any one cycle, the photon arrives at the modulator and the modulator is to be activated.

When individual photons or photon pairs are optionally generated, the activation and/or deactivation instant of the modulator is/are preferably determined from the optical path length of one or both interferometer arms. Based on knowledge of the remaining path lengths from the photon-pair source to the modulator, the activation instant when the earlier partial wave packet is to be influenced is derived from the photon's propagation time through the shorter interferometer arm. The activation operation is such that, upon arrival of the earlier partial wave packet, the modulator is already active, and, upon arrival of the later partial wave packet, it is already deactivated. If the later partial wave packet is to be influenced, then the modulator is switched on such that it is activated only upon arrival of the later partial wave packet. The accuracy required for activation in this case is derived from the transit-time difference between the two interferometer arms.

Alternatively or additionally thereto, the activation instant for influencing the one photon is determined from the registration instant of the other photon and from the particular optical path lengths. Since the intention is to continue to use both photons, the other photon is registered without destroying it. In principle, the photon may be detected in a non-destructive manner, in that it propagates through a non-linear medium, such as individual, highly excited atoms (Rydberg atoms). As the photon passes through, the medium changes its refractive index. This change in the refractive index is registered interferometrically by a test laser beam (so-called "quantum nondemolition" measurement).

To ensure that it is only the photons of a particular photon pair that are influenced, it is proposed that the period of activation of the modulator be shorter by at least half than the period duration of the pulsed photon-pair source.

Most applications require a modulator which is able to rotate the polarization of the photon or that of the partial-wave packet by 90°. For example, the electro-optical modulator is a $\lambda/2$ delay element, which is quickly rotated or switched on or off to change the polarization of the photon. As a modulator, a Pockel or Kerr cell is used on the basis of non-linear optical crystals, such as KDP, $LiNbO_3$, or on the basis of semiconductor materials such as GaAs. At the present time, these modulators have the capability of being switched with time constants in the nanosecond range; future development provides for further reductions in the typical time constants. A switching time of 1 ns signifies that the two residence probabilities of the photon must be set apart by about one meter to enable them to be separated.

DETAILED DESCRIPTION

Figure 1:
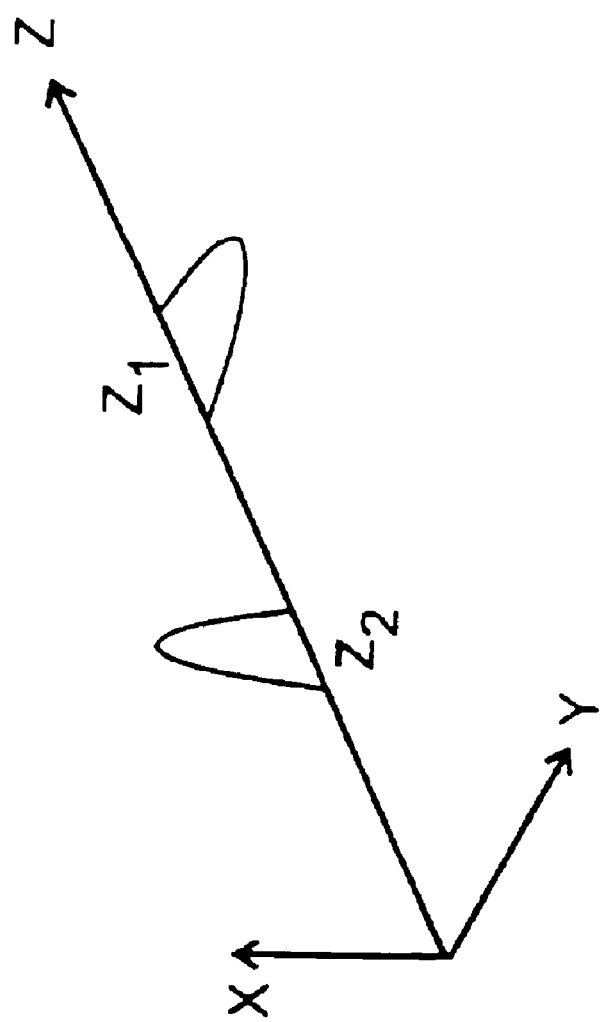
FIG. 1 shows a photon having two residence probability regions of orthogonal, linear polarization.

FIG. 1 schematically illustrates the spatial residence probability and polarization of a photon propagating along the z-axis, based on the example of two residence probability regions. In the region around Z1, it is linearly polarized in the y-direction; in the region around Z2, it is linearly polarized in the x-direction. Such a wave function or residence probability is achieved using a polarizing interferometer, which is oriented at less than 45° to the photon's starting polarization, so that both interferometer arms are passed through with equal probability. Here, the residence probabilities around Z1 and Z2 are separated by a region in which the residence probability is zero. The distance Z1–Z2 may be given by the optical path length difference in the interferometer arms. The greater the distance Z1–Z2 is, the more easily the two regions may be able to be separately influenced.

Figure 2:
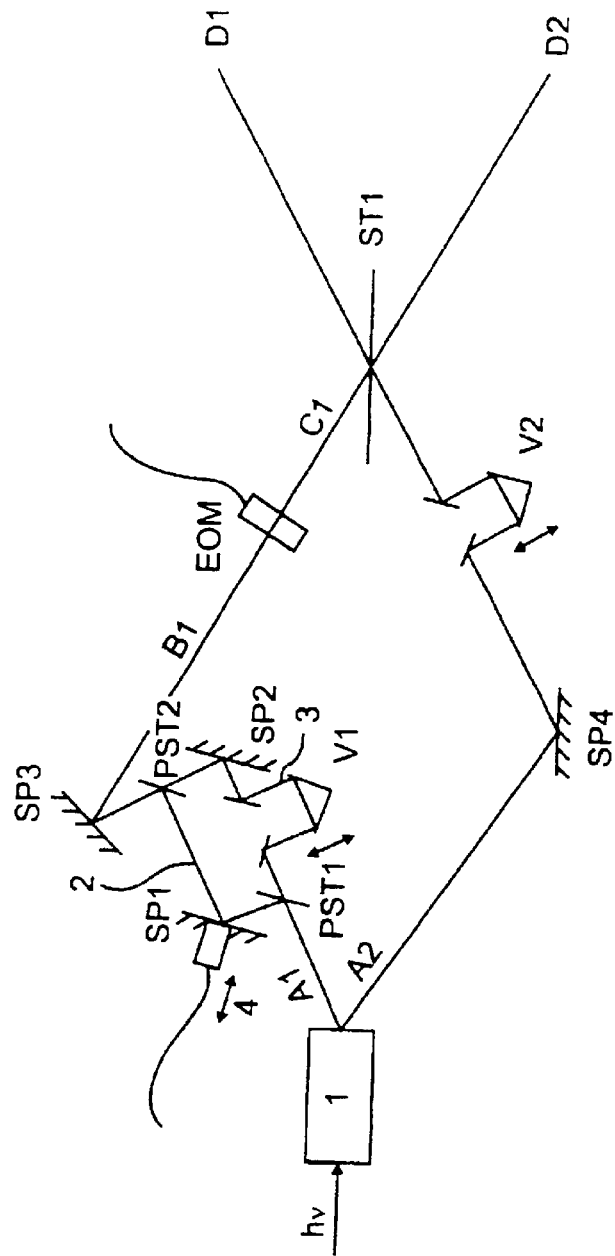
FIG. 2 shows a set-up for implementing the method(s) according to the present invention.

FIG. 2 illustrates a set-up for implementing the method for selectively changing the polarization of a photon in accordance with embodiments and/or methods of the present invention. Using a highly coherent intensive laser hv, in non-linear crystal 1, parametric fluorescence produces photon pairs which propagate through partial ray paths A1 and A2. The pump photon decays into two photons of about half energy. Depending on the type of decay, photons may be formed which are identically (type I) or orthogonally (type II) polarized.

Partial ray paths A1 and A2 are deflected by two mirrors SP3 and SP4 at a beam splitter ST1 and directed by this beam splitter into two shared output channels D1 and D2.

An interferometer may be positioned in first partial ray path A1. The interferometer is a polarizing Mach-Zehnder interferometer which is positioned at less than 45° to the polarization direction of the first photon. It is made up of two polarizing beam splitters PST1 and PST2 and two mirrors SP1 and SP2, of which SP1 is electrically adjustable by a piezoceramic element 4. Beam splitter PST1 guides partial ray path A1 into the two interferometer arms 2 and 3; PST2 reunites them. An additional delay path in interferometer arm 3 permits delays of variable lengths, up to the meter range. Subsequent to beam splitter PST2 in the output of the interferometer, the probability residence of the photon, as shown in FIG. 1, is split into two regions Z1, Z2, which are variably polarized.

In accordance with the present invention, an electro-optical modulator EOM is positioned in first partial ray path A1 to selectively change the polarization of the photon. This modulator splits the partial ray path at the interferometer, into two regions B1 and C1. Modulator EOM may be used in accordance with the present invention to adjust the polarization of the one half of the double-peak photon wave packet to the polarization of the other half. The EOM may be electrically driven in such a way that it only influences one of the two partial wave packets. It must be fast enough to enable the switching to be performed in the intermediate region between Z1 and Z2 (compare FIG. 1). As a modulator, a rapidly switchable $\lambda/2$ delay plate may be used, which is either rapidly rotatable or switchable on and off for purposes of activation or deactivation.

By adapting the optical path lengths of the interferometer arms 2, 3 and of second partial ray path A2, as described in the reference German Patent Application No. DE 198 29 849.5, photon pairs or individual photons may be optionally generated. This process can be twice as efficient when the polarization state of the first photon is changed in accordance with the present invention.

Figure 3:
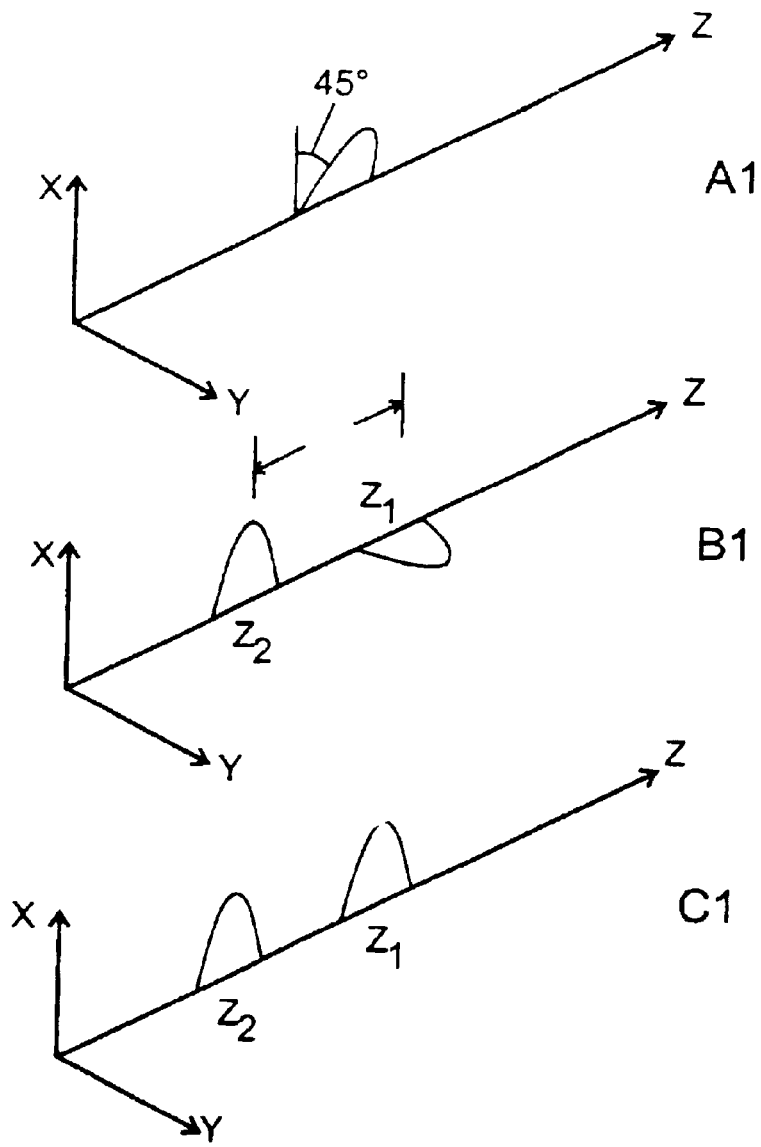
FIG. 3 shows the residence probability and polarization of a photon at various locations of the set-up of FIG. 2.

FIG. 3 illustrates the residence probability and the polarization of a photon at various locations of the set-up of FIG. 2. Immediately upon arrival in first partial ray path A1, the photon is linearly polarized under 45°. After propagating through the polarizing interferometer, the photon in region B1 exhibits a residence probability, having orthogonal polarization, concentrated in two regions around Z1 and Z2, as illustrated in FIG. 2 and described. Using electro-optical modulator EOM, the polarization of the partial wave packet may be changed by Z1 and is adapted to the polarization of the other partial wave packet, region C1. This thus manipulated first photon is brought into interference with the second photon of the photon pair by beam splitter ST1.

Figure 4:
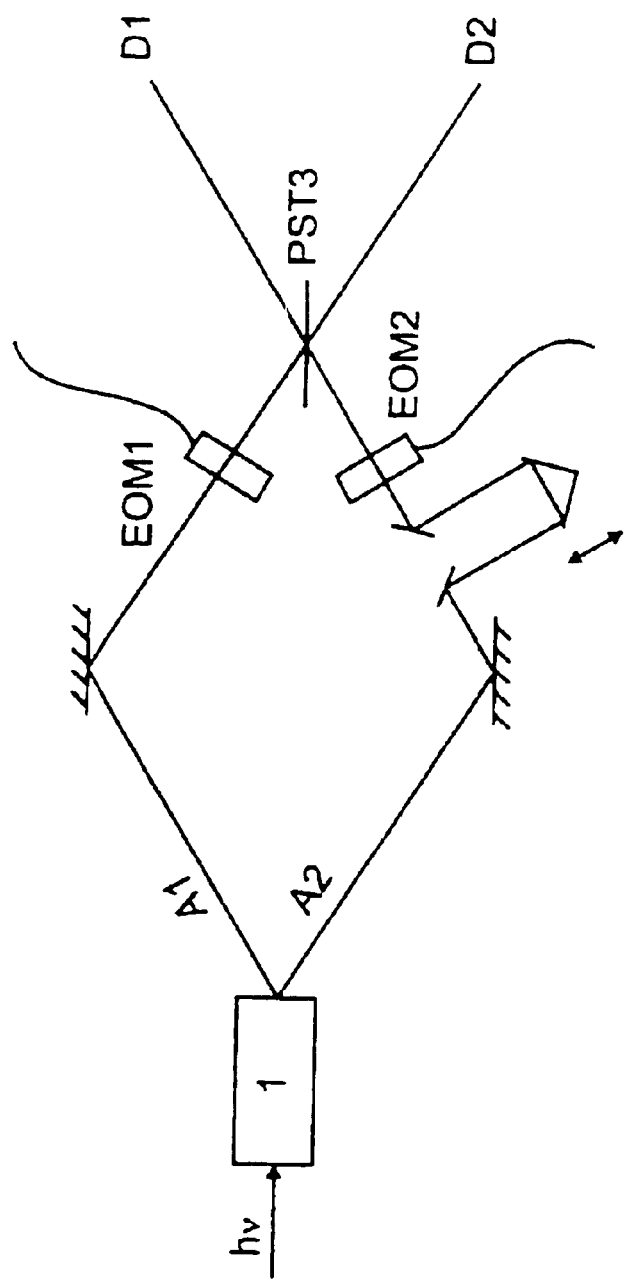
FIG. 4 shows a set-up for optionally generating individual photons or photon pairs using a polarizing beam splitter.

FIG. 4 depicts another system for optionally generating individual photons or photon pairs employing a polarizing beam splitter PST3 and polarization manipulation in accordance with the present invention. As in the set-up from FIG.

2, using a highly coherent, intensive laser hv, in non-linear crystal 1, parametric fluorescence produces photon pairs which propagate through partial ray paths A1 and A2. The partial ray paths are reunited via two mirrors at a polarizing beam splitter PST3 and directed into two shared output channels D1 and D2. In a described manner, to change over the polarization of the particular photon, an electro-optical modulator EOM1, EOM2 is positioned in both partial ray paths A1, A2.

If the photons of the photon pair meet beam splitter PST3 with the same, e.g., linear, vertical polarization, then both are reflected. If they meet beam splitter PST3 with polarization that is orthogonal thereto, e.g., linear, horizontal, then both are transmitted. In both cases, one receives individual photons in outputs D1 and D2. Variably orthogonally polarized photons arrive as a pair in one of outputs D1 or D2.

The polarization of one of the photons may be selectively switched over by modulators EOM1, EOM2, making it possible to determine in which output it arrives. In this manner, photon pairs may also be selectively produced. As described, the modulators' switching times are determined, for example, from the repetition rate and the path lengths. Since the probability distribution of the photons is not split, activation of the modulator may begin prior to arrival of the photon; it is not necessary for the modulator to be activated or deactivated as rapidly as in the case of polarization change within the same photon-wave function. It suffices when the modulator is deactivated up until the next cycle, and is able to be activated again.

The present invention may be used, among other things, for example, in the field of quantum computers and quantum cryptography to further enhance efficiency.

What is claimed is:

1. A method for changing the polarization of at least one of the photons emitted from a photon pair source into various partial ray paths using an electro-optical modulator, which is positioned in a first ray path being traversed by the photon to be influenced and which, in the activated state, is able to alter the polarization of a photon, wherein the modulator is activated as a function of time such that the probability that the photon is found in the region of the electro-optical modulator in the activated state is at a maximum, and the modulator must be deactivated following passage through the maximum, the photon-pair source being an optically non-linear crystal that is pumped using a pulsed laser, and the instant when the modulator is activated (activation instant) being determined from the pulse-repetition rate and from the optical path length from the crystal to the electro-optical modulator;

and/or the activation instant for influencing the one photon being determined from the registration instant of the other photon, the other photon being registered without being destroyed.

2. A method for optionally generating individual photons or photon pairs in an optical channel using a photon-pair source, the photons of one photon pair being coupled into one partial path of rays of the device, and the two partial ray paths being united at a beam splitter and directed into two shared output channels of an interferometer positioned in the first partial ray path, as well as means for changing the optical path lengths of the interferometer arms and/or of the second partial path of rays, in the first partial ray path downstream from the interferometer, an electro-optical modulator being positioned, which, in the activated state, is able to alter the polarization of a photon, wherein the modulator is activated as a function of time such that the probability that the photon is found in the region of the electro-optical modulator in the activated state is at a maximum, and the modulator must be deactivated following passage through the maximum, the photon-pair source being an optically non-linear crystal that is pumped using a pulsed laser, and the instant when the modulator is activated (activation instant), being determined from the pulse-repetition rate and from the optical path length from the crystal to the electro-optical modulator;

and/or the activation instant for influencing the one photon being determined from the registration instant of the other photon, the other photon being registered without being destroyed;

and/or the activation instant of the modulator being determined from the optical path length of one or both interferometer arms.

3. The method of claim 2, wherein the interferometer is a polarizing interferometer, which is positioned at less that 45° with respect to the polarization direction of the photon radiated into the first partial ray path.

4. The method of claim 1, wherein the modulator is able to rotate the polarization of the photon by 90°.

5. The method of claim 2, wherein the modulator is able to rotate the polarization of the photon by 90°.

6. The method of claim 1, wherein the electro-optical modulator is a $\lambda/2$ delay element, which is quickly rotated or switched on or off to change the polarization of the photon.

7. The method of claim 2, wherein the electro-optical modulator is a $\lambda/2$ delay element, which is quickly rotated or switched on or off to change the polarization of the photon.

8. The method of claim 1, wherein the period of activation of the modulator is shorter by at least half than the period duration of the pulsed photon-pair source.

9. The method of claim 2, wherein the period of activation of the modulator is shorter by at least half than the period duration of the pulsed photon-pair source.

* * * * *